US012613863B2

(12) United States Patent
Zhu et al.

(10) Patent No.: US 12,613,863 B2
(45) Date of Patent: Apr. 28, 2026

(54) INTEGRATED ARCHITECTURE SEARCHING SYSTEM AND METHOD

(71) Applicant: TSINGHUA UNIVERSITY, Beijing (CN)

(72) Inventors: Wenwu Zhu, Beijing (CN); Xin Wang, Beijing (CN); Zhikun Wei, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 691 days.

(21) Appl. No.: 18/148,252

(22) Filed: Dec. 29, 2022

(65) Prior Publication Data

US 2024/0220494 A1 Jul. 4, 2024

(51) Int. Cl.
    *G06F 16/00*     (2019.01)
    *G06F 16/2453*     (2019.01)
    *G06N 3/04*     (2023.01)
    *G06N 3/096*     (2023.01)

(52) U.S. Cl.
    CPC .......... *G06F 16/2453* (2019.01); *G06N 3/04* (2013.01); *G06N 3/096* (2023.01)

(58) Field of Classification Search
    CPC .................................................. G06F 16/2453
    See application file for complete search history.

(56) References Cited

U.S. PATENT DOCUMENTS 12,236,457 B2 * 2/2025 Zhu .................... G06Q 30/0272

* cited by examiner

*Primary Examiner* — Ajith Jacob

(74) *Attorney, Agent, or Firm* — Hodgson Russ LLP

(57) ABSTRACT

An integrated architecture searching system for a click-through rate prediction model is provided. The system includes a first search space configured to search for embedding vector dimensions of features and determine a matching embedding vector dimension for each pair of the features; a second search space configured to obtain a feature interaction result by searching for a feature interaction sub-network and a feature interaction combination; and a third search space configured to obtain a click-through rate prediction value by incorporating the feature interaction result into an high-order implicit feature interaction search space and performing high-order implicit feature interaction on deep networks of different layers.

11 Claims, 3 Drawing Sheets

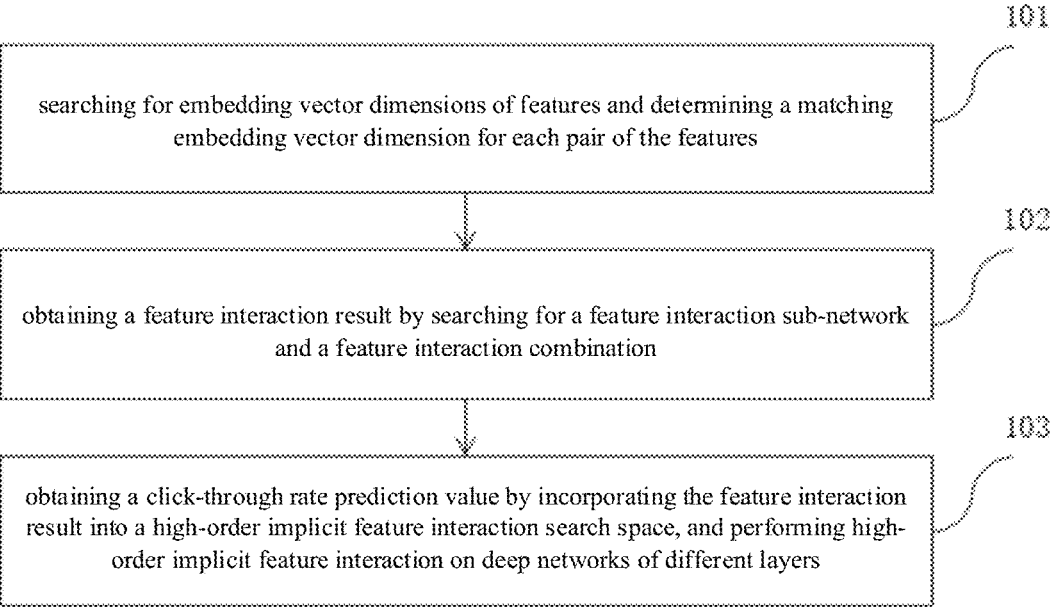

101 searching for embedding vector dimensions of features and determining a matching embedding vector dimension for each pair of the features

102 obtaining a feature interaction result by searching for a feature interaction sub-network and a feature interaction combination

103 obtaining a click-through rate prediction value by incorporating the feature interaction result into a high-order implicit feature interaction search space, and performing high-order implicit feature interaction on deep networks of different layers

FIG. 3

INTEGRATED ARCHITECTURE SEARCHING SYSTEM AND METHOD

FIELD

The present disclosure relates to a technology field of a click-through rate prediction model architecture, and more particularly to an integrated architecture searching system for a click-through rate prediction model and an integrated architecture searching method for a click-through rate prediction model.

BACKGROUND

Architecture design is crucial to the performance of click-through rate prediction models. However, in practice, a model architecture is manually designed for each of different recommendation tasks or datasets, resulting in a large cost on labor and resource for trial and error and validation. In addition, since the click-through rate prediction model is generally composed of several modules, an entire space cannot be searched for through a conventional architecture search algorithm.

SUMMARY

According to a first aspect of embodiments of the present disclosure, an integrated architecture searching system for a click-through rate prediction model is provided. The system includes a first search space configured to search for embedding vector dimensions of features and determine a matching embedding vector dimension for each pair of the features; a second search space configured to obtain a feature interaction result by searching for a feature interaction sub-network a feature interaction combination; and a third search space configured to obtain a click-through rate prediction value by incorporating the feature interaction result into a high-order implicit feature interaction search space and performing high-order implicit feature interaction on deep networks of different layers.

According to a second aspect of embodiments of the present disclosure, an integrated architecture searching method for a click-through rate prediction model is provided. The integrated architecture searching method includes searching for embedding vector dimensions of features and determining a matching embedding vector dimension for each pair of the features; obtaining a feature interaction result by searching for a feature interaction sub-network and a feature interaction combination; and obtaining a click-through rate prediction value by incorporating the feature interaction result into an implicit high-order feature interaction search space and performing high-order implicit feature interaction on deep networks of different layers.

According to a third aspect of embodiments of the present disclosure, a method for predicting a click-through rate is provided. The method includes obtaining network click-through rate data; and obtaining a click-through rate value by inputting the network click-through rate data into a click-through rate prediction model obtained by the integrated architecture searching method in the above-mentioned embodiments.

According to a fourth aspect of embodiments of the present disclosure, an electronic device is provided. The electronic device includes at least one processor; and a memory communicatively connected to the at least one processor for storing computer instructions executable by the at least one processor. The at least one processor is configured to execute the computer instructions to perform the integrated architecture searching method in the above-mentioned embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference to the drawings, in which:

FIG. 3 is a flow chart showing an integrated architecture searching method for a click-through rate prediction model in some embodiments of the present disclosure.

DETAILED DESCRIPTION

Figure 1:
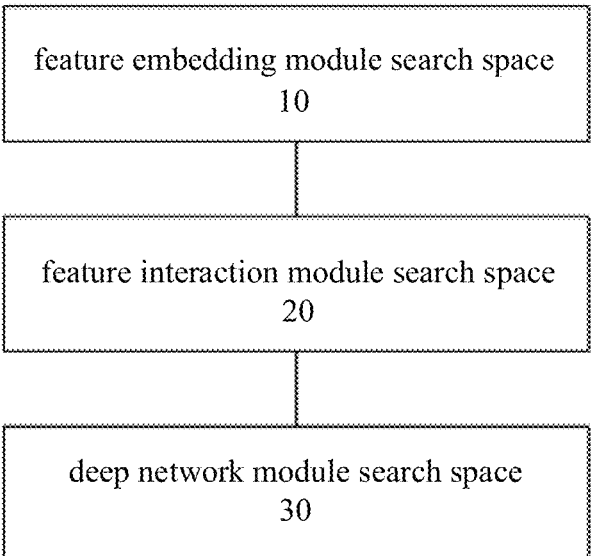
FIG. 1 is a block diagram showing an integrated architecture searching system for a click-through rate prediction model in some embodiments of the present disclosure.

Embodiments of the present disclosure are described in detail below, examples of which are illustrated in the drawings. The same or similar elements and the elements having the same or similar functions are denoted by the same or similar reference numerals in different drawings unless indicated otherwise. The embodiments described herein with reference to drawings are explanatory, and used to generally understand the present disclosure, but shall not be construed to limit the present disclosure.

In related works, there are two processes for designing the click-through rate prediction model as follows.

The first process is designing a network architecture for the click-through rate prediction model, including manual design of embedding vector dimensions, feature interaction modes and combinations and deep network modules appropriate for specific tasks and datasets. A linear model models the click-through rate prediction model as a linear classification problem. A factorization machine adopts factorization to perform feature interactions, which makes significant progress. Some models such as Wide&Deep, DeepFM and PIN are used to combine deep networks with traditional low-order interaction to mine a deep relationship between features.

The second process is applying neural network architecture search to the click-through rate prediction model, which may search for a single module by directly applying existing neural network architecture search algorithms. The existing modules may be further classified into a feature embedding module, a feature interaction module and a deep network module. For the feature embedding module, AutoEmb and AutoDim may search for the embedding vector dimension of features by using differentiable architecture search and weight sharing, respectively. For the feature interaction module, AutoFeature may search for sub-networks of feature interactions and combinations of feature interactions simultaneously, and AutoFIS may differentiate the search process of combinations of feature interactions to improve search efficiency. For the deep network module, no special work has been done to provide a search space and algorithm for searching.

The existing processes for designing the click-through rate prediction model generally rely on expert experience and manual debugging and design, which have a relatively low efficiency, a large cost of resources and labor, and a high requirement of techniques, and are prone to design biases and sub-optimal designs. The existing neural network architecture searching processes do not provide an integrated search framework for multiple modules of the entire model, resulting in a local optimal search result. In addition, if the relationship between modules is not modeled, the expressiveness of the modules will be inconsistent, thereby impacting overall performance. Furthermore, due to significant difference in the structure of modules, the existing search space and algorithm cannot be directly applied to the integrated model search, and cannot solve problems of adaptability and consistency between modules in the design of the click-through rate prediction model.

An automatic integrated architecture searching system for a click-through rate (CTR) prediction model and an automatic integrated architecture searching apparatus for a click-through rate prediction model according to embodiments of the present disclosure are described below with reference to the drawings.

FIG. 1 is a block diagram showing an integrated architecture searching system for a click-through rate prediction model in some embodiments of the present disclosure.

As shown in FIG. 1, the integrated architecture searching system includes a feature embedding module search space 10, a feature interaction module search space 20 and a deep network module search space 30.

The feature embedding module search space 10 is configured to search for embedding vector dimensions of features and determine a matching embedding vector dimension for each pair of the features.

The feature interaction module search space 20 is configured to obtain a feature interaction result by searching for a feature interaction sub-network and a feature interaction combination.

The deep network module search space 30 is configured to obtain a click-through rate prediction value by incorporating the feature interaction result into a high-order implicit feature interaction search space, and performing high-order implicit feature interaction on deep networks of different layers. In embodiments of the present disclosure, the integrated architecture searching system for the click-through rate prediction model includes the feature embedding module search space, the feature interaction module search space and the deep network module search space. The feature embedding module search space is configured to search for embedding vector dimensions of features and determine a matching embedding vector dimension for each pair of the features. The feature interaction module search space is configured to obtain a feature interaction result by searching for a feature interaction sub-network and a feature interaction combination. The deep network module search space is configured to obtain a click-through rate prediction value by incorporating the feature interaction result into a high-order implicit feature interaction search space, and performing high-order implicit feature interaction on deep networks of different layers. In this way, the integrated architecture searching system is provided, which solves problems of obtaining an inefficient design process and getting a suboptimal result in an existing network designing process for a click-through rate prediction model that relies on design experience of experts for a target task, data and field, as well as a large number of parameter regulations and trials and errors, and solves problems of being unable to obtain an optimal result since a search space and a search algorithm design of an existing neural network architecture search process are limited to a specific module without integrated search of a whole system. The present disclosure provides an integrated model search space including all modules, and further provides an automatic integrated search algorithm to generate a high-quality model architecture, which greatly improves the efficiency of building the click-through rate prediction model network and the integrity and the expressiveness of the click-through rate prediction model, and greatly reduces costs of time, resources, and labor for designing the neural network, thereby improving the efficiency of the design process.

The present disclosure achieves the integrated design of the search space for the click-through rate prediction model and the design of the corresponding search algorithm. For the design of the network search space for the click-through rate prediction model, the present disclosure provides a unified representation network search space having a plurality of consistent modules, which systematically summarizes and includes all existing manually designed network architectures, and includes the existing search spaces separately designed for searching a certain module. In the present disclosure, three modules and a connection between them are designed, which achieves a context integrated design for the connection between different module spaces, such that the connection between modules may adapt to two modules.

In some embodiments, the integrated architecture searching system further includes a mapping space configured to map feature combinations in different dimensions into a unified dimension space for interaction.

During dimension search of an embedding layer vector, the system includes the existing architecture space, and further includes an additional space designed to unify interaction dimensions. In the additional space, different feature combinations may be mapped to different interaction spaces.

In some embodiments, the feature interaction module search space is associated with structure selection of a feature embedding layer.

In an interaction layer, the system performs both search of an interaction function and search of an interaction combination, and the interaction layer is associated with the structure selection of the feature embedding layer.

In some embodiments, the integrated architecture searching system further includes an architecture generator configured to generate an integrated architecture of the click-through rate prediction model by generating an architecture of a current module based on structure selections of all search spaces before each of the search spaces in the integrated architecture searching system.

The present disclosure provides a super network training process based on a knowledge distillation technology to construct an integrated model architecture generator for modeling the connection between modules, which improves the efficiency of the search process.

In some embodiments, all sub-networks in the search spaces of the integrated architecture searching system are protocolled as a super network to perform joint optimization and update.

By protocolling all sub-networks in the space to the super network, parameters of all sub-networks in the space may be jointly optimized and updated, which greatly improves the efficiency of the search algorithm.

In some embodiments, the joint optimization and update includes in each round of training, training a sub-network with the largest number of parameters as a teacher network, and guiding training of remaining sub-networks with an output of the teacher network.

For the super network with multiple modules, the sub-networks trained in individual trainings generally affect each other, and the training parameters are generally not uniform. For this, the present disclosure adopts a process based on knowledge distillation. In each round of training, the sub-network with the largest number of parameters is trained as the teacher network, and the training of the remaining sub-networks is guided with the output of the teacher network. In this way, an overall update direction of the super network is consistent in each round of training, and the performance evaluation of the sub-network is stable.

Figure 2:
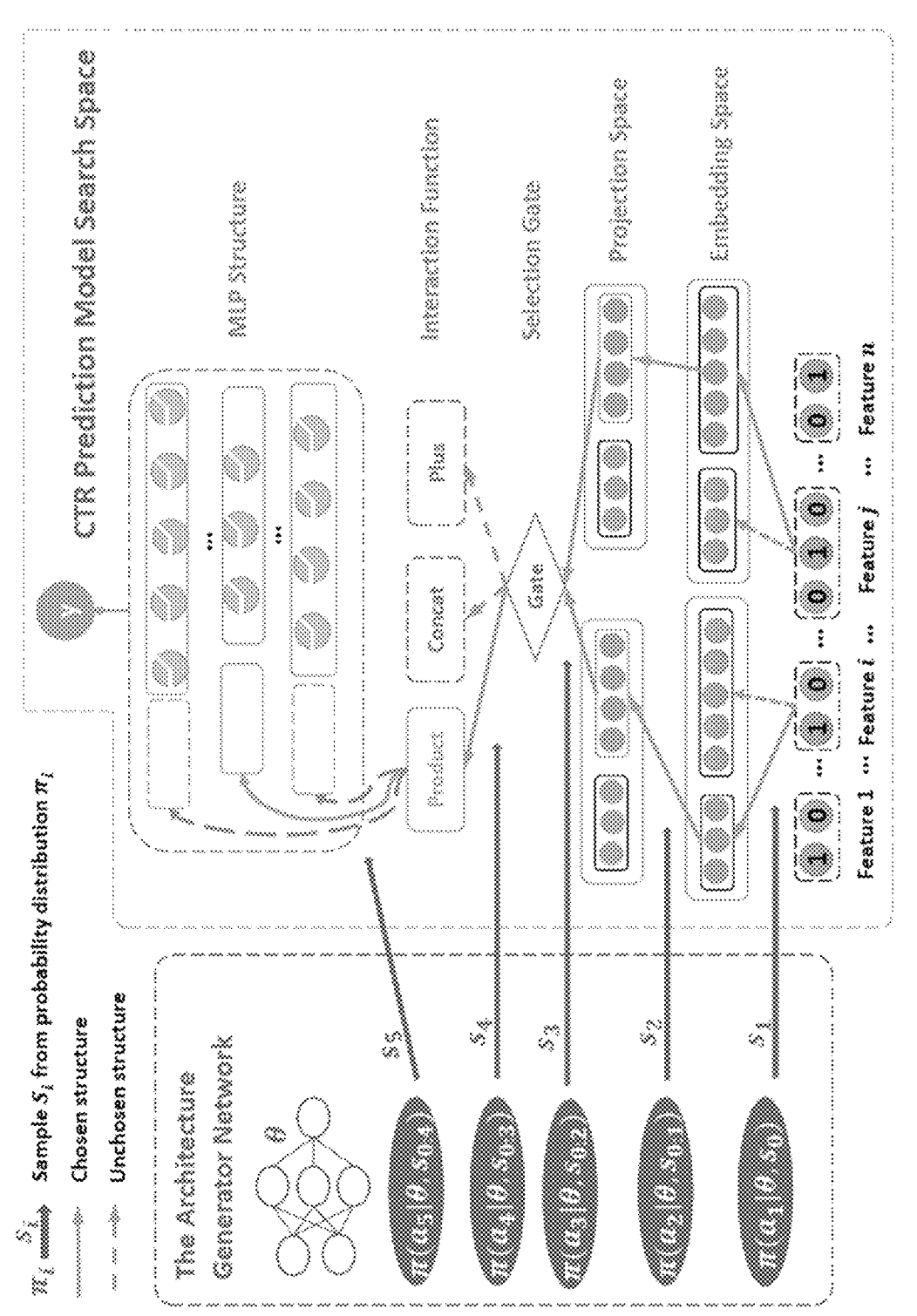
FIG. 2 is a schematic diagram showing an integrated architecture searching system for a click-through rate prediction model in some embodiments of the present disclosure.

FIG. 2 is a schematic showing an integrated architecture searching system for a click-through rate prediction model in some embodiments of the present disclosure.

As shown in FIG. 2, the left side is the architecture generator (i.e., architecture generator network), which is used to perform explicit modelling on the structural relationship between modules. An architecture distribution of each module depends on the architecture selection of a previous module. $\pi_c$ $(a_i|\theta, s_{0:i-1})$ is the probability distribution over component architecture space $a_i$ given the network parameter $\theta$ and all previous components architecture choice state $s_{0:i-1}$. The right side is the integrated search space for the click-through rate prediction model.

In the search space, all components have their own architecture space, and the architecture choice is sampled from the probability distribution generated by the architecture generator network. The CTR prediction model architecture is divided into the embedding component, the projection component, the interaction component, the selection component, and the multi-layer perceptron (MLP) structure component. The MLP component may be used to implicitly model high-order feature interaction. Each component contains an operation set according to its functionality. All the components compose a path for feature interaction.

The search space includes not only traditional hand-crafted architectures such as DeepFM, and Wide&Deep, but also the search space proposed by other NAS-based models such as AutoEmb, and AutoFIS.

FIG. 3 is a flow chart of an integrated architecture searching method for a click-through rate prediction model in some embodiments of the present disclosure.

As shown in FIG. 3, the integrated architecture searching method for the click-through rate prediction model includes the following steps 101 to 103.

In step 101, embedding vector dimensions of features are searched for and a matching embedding vector dimension is determined for each pair of the features.

In step 102, a feature interaction result is obtained by searching for a feature interaction sub-network and a feature interaction combination.

In step 103, a click-through rate prediction value is obtained by incorporating the feature interaction result into a high-order implicit feature interaction search space and performing high-order implicit feature interaction on deep networks of different layers.

In embodiments of the present disclosure, the integrated architecture searching method for the click-through rate prediction model includes searching for embedding vector dimensions of features and determining a matching embedding vector dimension for each pair of the features; obtaining a feature interaction result by searching for a feature interaction sub-network and a feature interaction combination; and obtaining a click-through rate prediction value by incorporating the feature interaction result into a high-order implicit feature interaction search space and performing high-order implicit feature interaction on deep networks of different layers. In this way, the integrated architecture searching method solves problems of obtaining an inefficient design process and getting suboptimal result in an existing network designing process for a click-through rate prediction model that relies on design experience of experts for a target task, data and field, as well as a large number of parameter regulations and trials and errors, and solves problems of being unable to obtain an optimal result since a search space and a search algorithm design of an existing neural network architecture search process are limited to a specific module without integrated search of a whole system. The present disclosure provides an integrated model search space including all modules, and further provides an automatic integrated search algorithm to generate a high-quality model architecture, which greatly improves the efficiency of building the click-through rate prediction model network and the integrity and the expressiveness of the click-through rate prediction model, and greatly reduces costs of time, resources, and labor for designing the neural network, thereby improving the efficiency of the design process.

In some embodiments, the method further includes mapping feature combinations in different dimensions into a unified dimension space for interaction.

In some embodiments, the method further includes generating an integrated architecture of the click-through rate prediction model by generating an architecture of a current component based on structure selection of all search spaces before each search space.

In some embodiments, the method further includes protocolling all sub-networks in the search spaces as a super network to perform joint optimization and update.

In some embodiments, performing joint optimization and update includes: in each round of training, training a sub-network with the largest number of parameters as a teacher network, and guiding training of remaining sub-networks with an output of the teacher network.

The present disclosure further provides a method for predicting a click-through rate. The method for predicting the click-through rate includes obtaining network click-through rate data; and obtaining a click-through rate value by inputting the network click-through rate data into a click-through rate prediction model obtained by the integrated architecture searching method in the above-mentioned embodiments.

In order to implement the above-mentioned embodiments, the present disclosure further provides an electronic device. The electronic device includes at least one processor; and a memory communicatively connected to the at least one processor for storing computer instructions executable by the at least one processor. The at least one processor is configured to execute the computer instructions to perform the integrated architecture searching method in the above-mentioned embodiments.

In order to implement the above-mentioned embodiments, the present disclosure further provides a non-transitory computer-readable storage medium. The non-transitory computer-readable storage medium has stored therein computer instructions that, when executed by a computer, cause the computer to perform the integrated architecture searching method for the click-through rate prediction model in the above-mentioned embodiments.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above-mentioned phrases are not necessarily referring to the same embodiment or example of the present disclosure. Furthermore, the particular features, structures, materials, or features may be combined in any suitable manner in one or more embodiments or examples. In addition, those skilled in the art may combine different embodiments or examples described in the specification and the features of different embodiments or examples without contradiction.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, for example, two or three, unless specified otherwise.

It will be understood that, the flow chart or any process or method described herein in other manners may represent a module, segment, or portion of code that includes one or more executable instructions to implement the specified logic function(s) or step(s) of the process. Moreover, those skilled in the art shall understand that the scope of the preferred embodiments of the present disclosure includes other implementations, and the functions may be performed in a substantially simultaneous manner or in a reverse order according to the functions involved, rather than in the order shown or discussed.

The logic and/or step described in other manners herein or shown in the flow chart, for example, a particular sequence table of executable instructions for realizing the logic function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include, but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, because, for example, the paper or other appropriate medium may be optically scanned and then edited, decrypted or processed with other appropriate methods when necessary to obtain the programs in an electronic manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by any one or a combination of the following techniques known in the art: a discrete logic circuit having a logic gate circuit for performing a logic function of a data signal, an application-specific integrated circuit having an appropriate combination logic gate circuit, a programmable gate array (PGA), a field programmable gate array (FPGA), etc.

Those skilled in the art shall understand that all or part of the steps in the above exemplifying method of the present disclosure may be achieved by commanding the related hardware with programs. The programs may be stored in a computer readable storage medium, and the programs include one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function module. When the integrated module is realized in a form of software function module and is sold or used as a standalone product, the integrated module may be stored in a computer readable storage medium.

The above-mentioned storage medium may be a read-only memory, a magnetic disc, an optical disc, etc.

Although explanatory embodiments have been shown and described, it would be appreciated by those skilled in the art that the above embodiments are illustrative and cannot be construed to limit the present disclosure, and changes, alternatives, modifications and variations may be made in the embodiments without departing from the scope of the present disclosure.

What is claimed is:

1. An integrated architecture searching system for a click-through rate prediction model, comprising:
  a processor; and
  a memory storing computer instructions which, when executed by the processor, the processor is configured to:
    search for embedding vector dimensions of features and determine a matching embedding vector dimension for each pair of the features;
    obtain a feature interaction result by searching for a feature interaction sub-network a feature interaction combination; and
    obtain a click-through rate prediction value by incorporating the feature interaction result into a high-order implicit feature interaction search space and performing high-order implicit feature interaction on deep networks of different layers.

2. The system according to claim 1, wherein the processor is further configured to:
  map feature combinations in different dimensions into a unified dimension space for interaction.

3. The system according to claim 1, wherein the processor is further configured to:
  generate an integrated architecture of the click-through rate prediction model by generating an architecture of a current component based on structure selection of all search spaces before each of the search spaces.

4. The system according to claim 1, wherein the processor is further configured to:

protocol all sub-networks in the search spaces as a super network to perform joint optimization and update.

5. The system according to claim 4, wherein the joint optimization and update comprises:

in each round of training, training a sub-network with a largest number of parameters as a teacher network, and guiding training of remaining sub-networks with an output of the teacher network.

6. An integrated architecture searching method for a click-through rate prediction model, comprising:

searching for embedding vector dimensions of features and determining a matching embedding vector dimension for each pair of the features;

obtaining a feature interaction result by searching for a feature interaction sub-network and a feature interaction combination; and obtaining a click-through rate prediction value by incorporating the feature interaction result into a high-order implicit feature interaction search space and performing high-order implicit feature interaction on deep networks of different layers.

7. The method according to claim 6, further comprising: mapping feature combinations in different dimensions into a unified dimension space for interaction.

8. The method according to claim 6, further comprising: generating an integrated architecture of the click-through rate prediction model by generating an architecture of a current component based on structure selection of all search spaces before each search space.

9. The method according to claim 8, further comprising: protocolling all sub-networks in the search spaces as a super network to perform joint optimization and update.

10. The method according to claim 9, wherein performing the joint optimization and update comprises:

in each round of training, training a sub-network with a largest number of parameters as a teacher network, and guiding training of remaining sub-networks with an output of the teacher network.

11. A method for predicting a click-through rate, comprising:

obtaining network click-through rate data; and obtaining a click-through rate value by inputting the network click-through rate data into a click-through rate prediction model obtained by:

searching for embedding vector dimensions of features and determining a matching embedding vector dimension for each pair of the features;

obtaining a feature interaction result by searching for a feature interaction sub-network and a feature interaction combination; and obtaining a click-through rate prediction value by incorporating the feature interaction result into a high-order implicit feature interaction search space and performing high-order implicit feature interaction on deep networks of different layers.

\* \* \* \* \*